April 6, 1965     J. TROWBRIDGE     3,177,355
AUTOMATIC HEADLIGHT ADJUSTING MECHANISM
Filed Oct. 29, 1962
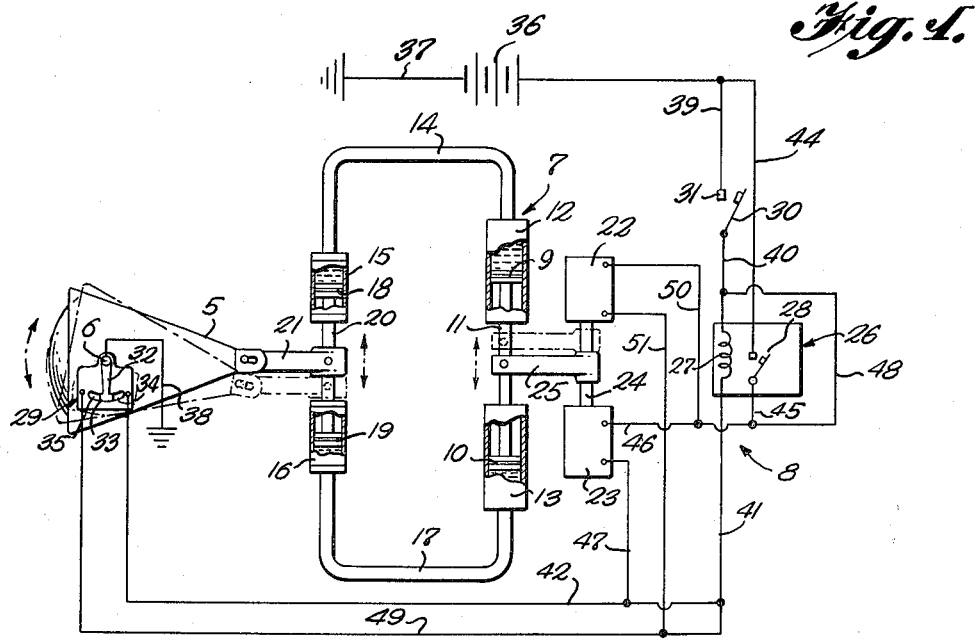
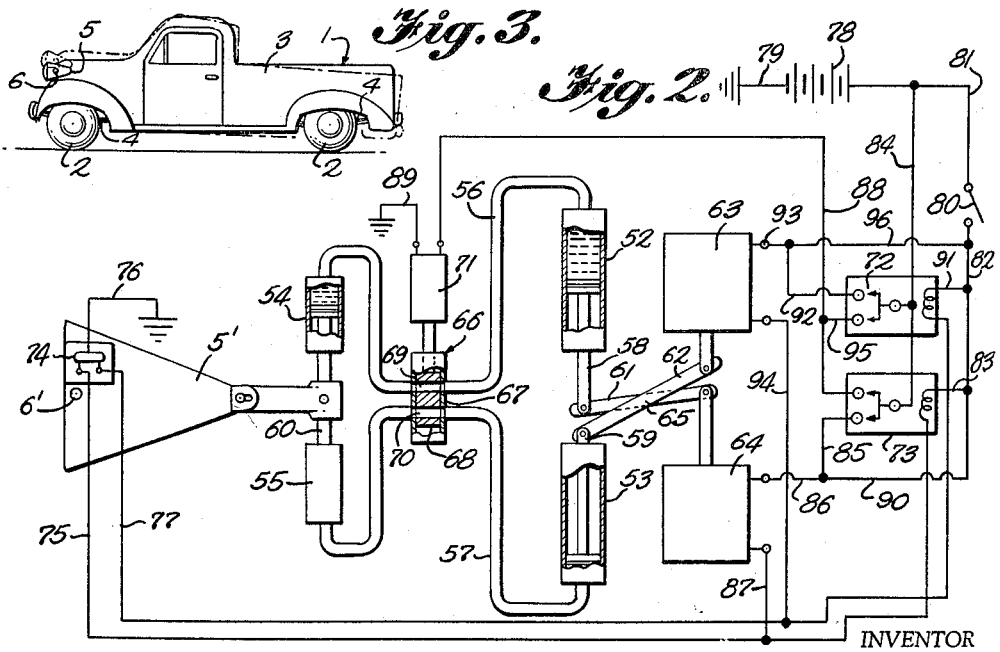
INVENTOR
*John Trowbridge*
BY *Mason, Fenwick & Lawrence*
ATTORNEYS

3,177,355
AUTOMATIC HEADLIGHT ADJUSTING MECHANISM
John Trowbridge, Morgan City, La.
(313 Broadmoor Blvd., Lafayette, La.)
Filed Oct. 29, 1962, Ser. No. 233,835
6 Claims. (Cl. 240—7.1)

This invention relates to means to automatically reset the headlights of an automobile or truck to compensate for angular changes in position of the vehicle body in order to maintain the headlights in proper position of adjustment relative to the ground.

It is desirable to change the position of vehicle headlights whenever there is a change in load, or load distribution. Increase in load at the back of the vehicle will depress the rear springs and lower the back end of the vehicle. This tilts the body so that the headlight angle is increased relative to the ground. If the headlight position is fixed, it will glare in the eyes of oncoming motorists.

Systems for automatically correcting the angular position of vehicle headlights in accordance with body angle changes have been proposed. These have operated in various ways, either automatically or manually, but in the automatic systems, the change of headlight was constant in response to any change in body position. This kept the headlight in constant motion during vehicle travel as the body angle changed under spring flexing. In travel over the road, it is virtually impossible for the headlights to adjust as rapidly as the vehicle body changes position. This frequently results in a worse condition than is present without correction. In manual systems, of course, an adjustment can be made when desired and the adjustment will be maintained until another manual operation is made.

The general object of the present invention is to provide means to adjust the headlight angle relative to the vehicle, when such adjustment is necessary, but to limit the adjustment to a single operation automatically performed when the vehicle is started.

A more specific object is to provide such a system which will be operative to adjust the headlights each time the vehicle engine is started.

Another object of the invention is to provide a system of this kind which will operate automatically whenever the vehicle ignition switch is turned to the start position, and, upon completion of adjustment, will be inoperative until the ignition switch is again in the start position.

A further object is the provision of an adjusting system which, when activated by movement of the ignition switch to the start position, will remain operative until the adjustment is completed, even though the ignition switch is not kept in the start position.

Other objects of the invention will become apparent from the following description of practical embodiments thereof, when taken in the light of the drawings which accompany, and form part of, this specification.

In the drawings:

FIGURE 1 is a schematic view showing an adjustable headlight and the fluid and electrical means proposed to automatically adjust the headlight when the vehicle body angle is changed relative to the ground level;

FIGURE 2 is a similar view showing a somewhat modified system; and

FIGURE 3 is a side view of a vehicle, illustrating diagrammatically how a vehicle body changes angle under load change and the compensating angle change is made in the headlight position by means of the present proposed system.

In general, the invention consists in means for varying a headlight position when the vehicle body angle changes, which means becomes operative whenever the vehicle is started, but which will be inoperative for further operation after the adjustment is completed and the vehicle is started.

Referring to the drawings in detail, and first adverting to FIGURE 3, a truck 1 is shown, having wheels 2, and carrying a body 3 suspended above the wheels 2 on springs 4. The truck has angularly adjustable headlights 5. A diagrammatic showing of a pivot for tilting the headlight relative to the truck body is made at 6. The adjusting means is not shown in this view. The unloaded position of the body is shown in full lines. When the truck is loaded, the rear springs are compressed, causing the body to assume a forwardly inclining angle, as shown in dotted lines. This will raise the headlight so that its beam will rise to shine in the eyes of an oncoming driver. By means of the present adjusting system, the headlight angle will be depressed to the proper degree to reposition the headlight in its correct position relative to the ground. This adjusted position is shown in dot and dash lines.

Referring now to FIGURE 1, the headlight 5 and its pivot 6 is shown in conjunction with a headlight adjusting system. The system is shown as including a fluid type headlight adjusting means 7, which is merely illustrative of any means, mechanical or otherwise, which under a reversible rectilinear force will tilt the headlight about its pivot. An electrical control circuit 8 governs the motivating force to actuate the adjusting means.

The adjusting means illustrated employs pairs of interconnected pistons movable in cylinders, with cylinders of one pair being in communication with similar cylinders of the other pair through fluid conduits. Pistons 9 and 10 are interconnected by rod 11 and are movable in cylinders 12 and 13, respectively. These are the driving members of the fluid system. It is obvious that the two piston assemblies, in fact, could be a single piston assembly with the one piston movable from a central position toward opposite ends of the cylinder. Cylinder 12 is connected by fluid conduit 14 with a cylinder 15. Cylinder 13 is connected to cylinder 16 by conduit 17. Pistons 18 and 19 are mounted in cylinders 15 and 16 and are interconnected by rod 20. Movement of rod 11 in one direction will cause movement of pistons 9 and 10 in their cylinders, and, through the fluid in conduits 14 and 17, equal and opposite movement of pistons 18 and 19 in cylinders 15 and 16. Rod 20 will move with pistons 18 and 19. Thus, if rod 11 is moved in one direction, rod 20 will move an equal amount in an opposite direction. By connecting rod 20 to the headlight 5 by means of link 21, the movement of rod 20 will serve to tilt the headlight about its pivot 6.

Motion is imparted to rod 11 by oppositely acting solenoids 22 and 23, which are interconnected by connector 24 which carries a link 25 for connection to rod 11. The solenoids are controlled by a relay 26, having a coil 27 and contacts 28, through circuits closed by a pendulum switch 29 and the vehicle ignition switch 30 when closed with its starter contact 31. This is the contact to which the ignition switch is turned in starting the vehicle engine, and, of course, could be a simple starter switch.

The pendulum switch includes a pivoted, gravity-operated arm 32, which is movable over an arcuate contact plate having a central "off" position 33, and end contact portions 34 and 35. The pendulum is mounted so that if the vehicle body is level, the pendulum arm 32 will contact the insulated "off" position 33. If the body tilts and the lamp is inclined or declined, the pendulum arm will move onto either contact 34 or contact 35.

The circuit is powered by the vehicle battery 36 which is grounded by wire 37. Pendulum switch 29 is also grounded by means of wire 38 connected to arm 32.

If the headlight is tilted as shown in dotted lines, pendulum arm 32 will be resting on contact 34. When the ignition, or starter, switch is moved to starting position, closing with contact 31, a circuit will be completed to cause the headlight to move back to its proper position as shown in full lines. This circuit includes line 39 from the battery to contact 31, switch arm 30, line 40 to relay coil 27, lines 41 and 42 to pendulum contact 34, pendulum arm 32 and ground line 38. This will energize the relay coil and close contacts 28 to complete a circuit to the proper solenoid for operating rod 11. In the present example, the circuit will be from the battery through line 44, contacts 28, lines 45 and 46 to solenoid 23, lines 47 and 42, contact 34, arm 32 and ground line 38. This will cause the solenoid to act moving rod 11 and link 25 from the dotted line position to the full line position. The movement thus imparted to the fluid system will move rod 21 in a reverse manner to bring the headlight back to the full line position.

Sometimes, the contact at switch 30 will be but momentary, and not long enough for the headlight to reach its adjustment position. To ensure completion of the adjusting movement even though switch 30 moves from contact 31, a by-pass line 48 for relay coil 27 is provided. Line 48 extends from line 45 from relay contacts 26 to line 40 to carry current to the relay coil.

If the load is removed from the truck so that the body reassumes its original position, pendulum arm 32 will engage contact 35 to establish a circuit to bring the lamp back to its original position. This includes the battery line 39, contacts 31, 30, wire 40, relay coil 27, lines 41 and 49, contact 35, arm 32 and ground wire 38. Relay 26 will be energized and close contacts 28 to complete a circuit through solenoid 22. This runs from the battery through wire 44, contacts 28, wires 45 and 50, solenoid 22, wires 51 and 49, contact 35, arm 32 and ground wire 38. The holding circuit for the relay through wire 48 will be operative again if switch 30 is opened.

It will be seen that the disclosed system will be operative to readjust a vehicle headlight if the vehicle body is tilted from its normal position relative to the ground. The headlight will be brought back to its original angle relative to the ground. The adjustment will take place only when the vehicle is being started. Thus, automatic adjustment is made each time the vehicle is started, if adjustment is needed, but when the lamp is adjusted, the system will be inoperative, and the headlight will remain in fixed position until the starter switch is closed again. This assures adjustment after each loading operation.

The system shown in FIGURE 2 is essentially the same as that just described, but differs in some details. The headlight 5 is pivoted at 6' as before. A hydraulic system including piston assemblies 52 and 53, 54 and 55 interconnected by conduits 56 and 57 is employed. The pistons of assemblies 52 and 53 carry rods 58 and 59 and the pistons of assemblies 54 and 55 are connected by rod 60. Rod 60 is connected to headlight 5' as before. Rods 58 and 59 are coupled by levers 61 and 62 to the armatures of solenoids 63 and 64. Levers 61 and 62 are pivoted at their centers, as at 65, for rocking movement. Thus, when one solenoid is actuated, it will move the piston to which it is connected. This will cause equal and opposite movement of the pistons to which the headlight is connected through rod 60.

In the embodiment shown in FIGURE 2, the conduits 56 and 57 are controlled by a cut-off valve 66. The valve has a casing 67 housing a slidable plug 68 having ports 69 and 70. The plug is moved to put ports 69 and 70 in communication with conduits 56 and 57, to permit flow through the conduits by solenoid 71. When the valve is in position closing off lines 56 and 57, that portion of the fluid system including piston assemblies 54 and 55 will be blocked off and the headlight will be positively held against movement.

Solenoids 63 and 64 are controlled by electric circuits which include relays 72 and 73 and a mercury switch 74. The mercury switch will be mounted on the headlight and when tilted will close a circuit from line 75 to ground wire 76, or from line 77 to the ground wire. The circuits are powered by battery 78 which is grounded through wire 79. The starter switch, or the starter contacts of the ignition switch are shown at 80.

When the vehicle is tilted so as to cause switch 74 to close between line 75 and ground 76, and switch 80 is closed, a circuit will be set up through relay 73 and solenoid 64 to correct the headlight position. At the same time, solenoid 71 is energized to open valve 67 and permit fluid flow through conduits 56 and 57. This circuit includes the battery, line 81, switch 80, wires 82 and 83 to the coil of relay 73, and wire 75 to switch 74. The contacts of relay 73 will close and complete a circuit from the battery through line 84, contacts of relay 73, wires 85 and 86 to solenoid 64, lines 87 and 75, switch 74 and ground line 76. At the same time, current will flow from the contacts of relay 73 through line 88 to solenoid 71 and to ground wire 89 to operate the valve. In this form of the invention the holding circuit for relay 73 includes wire 85 from the contacts of the relay, and lines 90 and 83 to the relay coil. When the headlight reaches adjusted position, switch 74 will open deenergizing relay 73 and the solenoids 64 and 71.

When switch 74 closes between line 77 and ground 76, a circuit through relay 72 and solenoid 63 is established. This includes the battery, line 81, switch 80, lines 82 and 91 to the coil of relay 72, and line 77 to switch 74. When the contacts of relay 72 close, a circuit is completed from the battery through line 84 to the contacts of relay 72, lines 92 and 93 to solenoid 63, and lines 94 and 77 to switch 74. A circuit is also set up from the contacts of relay 72 through lines 95 and 88 to solenoid 71. The holding circuit for the coil of relay 72 is through wires 92, 96, 82 and 91.

The differences between the two systems disclosed lies in the use in the system shown in FIGURE 2 of independent relays for the solenoids 63 and 64, independent connections from the solenoids to cylinder assemblies 52 and 53, a mercury switch, and the valve 67 to lock the system between adjustment cycles. Otherwise the two function in substantially the same manner and produce the same result.

While in the above several practical embodiments of the invention have been disclosed, it will be obvious that the details of construction shown and described are merely by way of example, and the invention may take other forms within the scope of the appended claims.

What is claimed is:

1. In a vehicle having a headlight mounted for vertical angular adjustment, means to adjust the headlight angular position relative to the vehicle in response to changes in vehicle angle under load comprising, means coupled to the headlight to tilt the headlight vertically, and a control means for the headlight tilting means, the control means including, a source of electric power, a tilt-switch carried by the headlight open when in a predetermined position and closed when tilted in a vertical plane in either direction from that position, vehicle starter contacts, means to move the headlight tilting means in opposite directions, and circuits interconnecting the power source, tilt switch starter contacts and means to move the headlight tilting means in opposite directions, and means to energize the means to move the headlight tilting means when the starter contacts are closed and the tilt switch is tilted in one direction from the predetermined position to activate the means to move the headlight tilting means in one direction, and when the starter contacts are closed and the tilt switch is tilted in an opposite direction from the predetermined position to activate the means to move the headlight tilting means in an opposite direction.

2. In a vehicle having a headlight mounted for vertical angular adjustment, means to adjust the headlight angular position relative to the vehicle in response to changes in vehicle angle under load as claimed in claim 1 wherein, the means to move the headlight tilting means includes a solenoid in circuit with the tilt switch for closing when the switch is tilted in one direction, and a solenoid in circuit with the tilt swtch for closing when the switch is tilted in an opposite direction.

3. In a vehicle having a headlight mounted for vertical angular adjustment, means to adjust the headlight angular position relative to the vehicle in response to changes in vehicle angle under load as claimed in claim 2, wherein, there is a holding circuit to keep the means to move the headlight tilting means energized as long as the tilt switch is closed even though the starter contacts are opened.

4. In a vehicle having a headlight mounted for vertical angular adjustment, means to adjust the headlight angular position relative to the vehicle in response to changes in vehicle angle under load as claimed in claim 2 wherein, the tilt switch is a pendulum switch.

5. In a vehicle having a headlight mounted for vertical angular adjustment, means to adjust the headlight angular position relative to the vehicle in response to changes in vehicle angle under load as claimed in claim 2 wherein, the tilt switch is a mercury switch.

6. In a vehicle having a headlight mounted for vertical angular adjustment, means to adjust the headlight angular position relative to the vehicle in response to changes in vehicle angle under load as claimed in claim 2 wherein, the means to tilt the headlight is a closed circuit fluid system having a piston in a cylinder movable by the solenoids and a piston in a cylinder connected to the headlight with a closed fluid-filled conduit connecting said cylinders.

References Cited by the Examiner

UNITED STATES PATENTS

| | | | |
|---|---|---|---|
| 1,362,085 | 12/20 | Davies | 240—41.61 |
| 2,049,802 | 8/36 | Hamm | 240—62.3 |
| 2,128,899 | 9/38 | Barnhardt. | |
| 2,557,590 | 6/51 | Beckerman et al. | 240—62 |
| 2,846,551 | 8/58 | Linder et al. | 240—7.1 X |
| 2,932,726 | 4/60 | Hunter | 240—2 |

FOREIGN PATENTS

| | | |
|---|---|---|
| 517,637 | 2/53 | Belgium. |
| 953,043 | 11/56 | Germany. |
| 1,131,109 | 6/62 | Germany. |

NORTON ANSHER, *Primary Examiner.*